United States Patent
Takahashi et al.

(10) Patent No.: US 9,364,818 B2
(45) Date of Patent: Jun. 14, 2016

(54) ZEOLITE STRUCTURE AND METHOD FOR PRODUCING THE SAME

(75) Inventors: Akira Takahashi, Nagoya (JP); Shogo Hirose, Gifu (JP); Eriko Kodama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 579 days.

(21) Appl. No.: 12/910,948

(22) Filed: Oct. 25, 2010

(65) Prior Publication Data

US 2011/0105303 A1 May 5, 2011

(30) Foreign Application Priority Data

Nov. 5, 2009 (JP) .................................. 2009-254040
Sep. 7, 2010 (JP) .................................. 2010-200078

(51) Int. Cl.
| | |
|---|---|
| B01J 37/30 | (2006.01) |
| B01J 29/04 | (2006.01) |
| B01J 29/064 | (2006.01) |
| B01D 53/94 | (2006.01) |

(Continued)

(52) U.S. Cl.
CPC ........... *B01J 29/064* (2013.01); *B01D 53/9418* (2013.01); *B01J 29/072* (2013.01); *B01J 35/04* (2013.01); *B01J 37/0009* (2013.01); *B01J 37/0201* (2013.01); *C04B 38/0009* (2013.01); B01D 2251/2062 (2013.01); B01D 2255/104 (2013.01); B01D 2255/20738 (2013.01); B01D 2255/20761 (2013.01); B01D 2255/502 (2013.01); B01D 2255/504 (2013.01); B01D 2257/702 (2013.01); B01J 29/44 (2013.01); B01J 29/46 (2013.01); B01J 29/7615 (2013.01); B01J 2229/186 (2013.01); C04B 2111/0081 (2013.01); C04B 2111/00413 (2013.01)

(58) Field of Classification Search
CPC ............ B01J 29/44; B01J 29/46; B01J 29/64; B01J 29/72; B01D 53/9418; B01D 2255/104; B01D 2255/20738; B01D 2255/20761; B01D 2255/502; B01D 2255/504
USPC .......................... 502/60, 74, 85; 428/116, 180
See application file for complete search history.

(56) References Cited

U.S. PATENT DOCUMENTS

| | | | |
|---|---|---|---|
| 4,458,025 A * | 7/1984 | Lee et al. ......................... | 502/66 |
| 6,555,492 B2 | 4/2003 | Faber et al. | |

(Continued)

FOREIGN PATENT DOCUMENTS

| | | |
|---|---|---|
| EP | 0 519 073 A1 | 12/1992 |
| EP | 0 756 891 A1 | 2/1997 |

(Continued)

OTHER PUBLICATIONS

Machine translation of Ono (JP2010-000499).*

*Primary Examiner* — Jun Li
(74) *Attorney, Agent, or Firm* — Burr & Brown, PLLC

(57) ABSTRACT

A zeolite structure is provided which has partition walls composed of a zeolite ion-exchanged with a metal ion and forming a plurality of cells extending from one end face of the zeolite structure to its other end face and functioning as a passage of fluid and which has a honeycomb shape. The content per unit zeolite amount of the metal ion in the surface portion of the partition wall is larger than the content per unit zeolite amount of the metal ion in the inner portion of the partition wall and is preferably 1.1 to 5.0 times the content per unit zeolite amount of the metal ion in the inner portion of the partition wall.

16 Claims, 2 Drawing Sheets

(51) Int. Cl.
*B01J 29/072* (2006.01)
*B01J 35/04* (2006.01)
*B01J 37/00* (2006.01)
*B01J 37/02* (2006.01)
*C04B 38/00* (2006.01)
*B01J 29/44* (2006.01)
*B01J 29/46* (2006.01)
*B01J 29/76* (2006.01)
*C04B 111/00* (2006.01)

(56) References Cited

U.S. PATENT DOCUMENTS

| | | |
|---|---|---|
| 2003/0224933 A1 | 12/2003 | Kondo et al. |
| 2007/0161509 A1 | 7/2007 | Bruggendick et al. |
| 2007/0259770 A1 | 11/2007 | Hofmann et al. |
| 2008/0034740 A1* | 2/2008 | Strehlau et al. .................. 60/299 |
| 2008/0167178 A1 | 7/2008 | Malyala et al. |
| 2009/0255240 A1* | 10/2009 | Doring ............................ 60/299 |
| 2009/0291833 A1* | 11/2009 | Ohno et al. ..................... 502/65 |
| 2009/0305873 A1* | 12/2009 | Ohno et al. ..................... 502/65 |
| 2010/0055386 A1* | 3/2010 | Ohno et al. ................... 428/116 |

FOREIGN PATENT DOCUMENTS

| | | |
|---|---|---|
| EP | 1 797 954 A1 | 6/2007 |
| EP | 1 847 320 A1 | 10/2007 |
| EP | 2 105 195 A1 | 9/2009 |
| JP | 2007-296521 A1 | 11/2007 |
| WO | 01/47634 A1 | 7/2001 |

* cited by examiner

ZEOLITE STRUCTURE AND METHOD FOR PRODUCING THE SAME

FIELD OF THE INVENTION

The present invention relates to a zeolite structure and a method for producing the zeolite structure. More particularly, the present invention relates to a zeolite structure having a high purification performance for NOx and a high adsorption capability for hydrocarbons as well as to a method for producing the zeolite structure.

BACKGROUND OF THE INVENTION

In order to purify the NOx, etc. contained in the exhaust gases emitted from automobile engines, engines for construction machines, industrial stationary engines, burners, etc. or to adsorb the hydrocarbons contained therein, there have been used catalysts produced by loading an ion-exchanged zeolite on a honeycomb-shaped ceramic carrier (a honeycomb structure) composed of cordierite or the like.

When a zeolite has been loaded on a ceramic carrier composed of cordierite or the like, the cordierite of the like shows no action such as NOx purification, hydrocarbons adsorption, or the like; consequently, the presence of the cordierite or the like causes an increase in pressure loss when an exhaust gas passes.

Meanwhile, there were proposed methods for producing a honeycomb structure per se by forming a forming material containing a zeolite ion-exchanged with a metal ion and then firing the formed material (see, for example, Patent Documents 1 to 3).

Patent Document 1: JP-A-2007-296521
Patent Document 2: U.S. Patent Application Laid-Open No. 2008-167178
Patent Document 3: U.S. Pat. No. 6,555,492

In the conventional methods for producing a honeycomb structure per se by forming a zeolite ion-exchanged with a metal ion and then firing the formed ion-exchanged zeolite, the ion-exchanged zeolite is exposed to a binder or high-temperature steam in the forming and subsequent firing, which has caused the movement and removal of metal ion in zeolite, the destruction of zeolite structure and the resultant reduction in catalytic activity and adsorption capability.

Further, in treating an exhaust gas using a conventional honeycomb structure composed of a zeolite ion-exchanged with a metal ion, i.e. a honeycomb-shaped zeolite structure, a major portion of the exhaust gas was treated around the surface of each partition wall and the amount of the exhaust gas penetrating into the inner portion of the partition wall was relatively small. Further, in the conventional honeycomb structure composed of a zeolite ion-exchanged with a metal ion, the distribution of the metal ion in the thickness direction of the partition wall was uniform, which made it impossible to effectively utilize the metal ion present in the inner portion of the partition wall.

SUMMARY OF THE INVENTION

Problems to be Solved by the Invention

The present invention has been made in view of the above problems and provides a zeolite structure having a high purification performance for NOx and a high adsorption capability and a method for producing the zeolite structure.

Means to Solve the Problem

In order to achieve the above problem, the present invention provides a zeolite structure and a method for producing the zeolite structure, both described below.

According to a first aspect of the present invention, a zeolite structure is provided, which has partition walls composed of a zeolite ion-exchanged with a metal ion and forming a plurality of cells extending from one end face of the zeolite structure to its other end face and functioning as a passage of fluid and which has a honeycomb shape, wherein the content per unit zeolite amount of the metal ion in the surface portion of the partition wall is larger than the content per unit zeolite amount of the metal ion in the inner portion of the partition wall.

According to a second aspect, the zeolite structure according to the first aspect is provided, wherein the content per unit zeolite amount of the metal ion in the surface portion of the partition wall is 1.1 to 5.0 times the content per unit zeolite amount of the metal ion in the inner portion of the partition wall.

According to a third aspect of the present invention, the zeolite structure according to first or second aspects is provided, wherein the metal ion in the surface portion of the partition wall is at least one kind selected from the group consisting of iron ion, copper ion and silver ion and the metal ion in the inner portion of the partition wall is at least one kind selected from the group consisting of iron ion, copper ion and silver ion.

According to a fourth aspect of the present invention, the zeolite structure according to any of first to third aspects is provided, wherein the main metal ion in the surface portion of the partition wall and the main metal ion in the inner portion of the partition wall are different from each other.

According to a fifth aspect of the present invention, the zeolite structure according to the fourth aspect is provided, wherein the main metal ion in the surface portion of the partition wall is iron ion and the main metal ion in the inner portion of the partition wall is copper ion.

According to a sixth aspect of the present invention, a method for producing a zeolite structure is provided, which comprises extruding a forming material comprising a zeolite powder and a forming aid, to form a honeycomb-shaped body which has partition walls forming a plurality of cells extending from one end face of the honeycomb-shaped body to its other end face and functioning as a passage of fluid, firing the honeycomb-shaped body, and subjecting the fired honeycomb-shaped body to an ion exchange treatment with a metal ion, to produce a zeolite structure wherein the content per unit zeolite amount of the metal ion in the surface portion of the partition wall is larger than the content per unit zeolite amount of the metal ion in the inner portion of the partition wall.

According to a seventh aspect of the present invention, the method for producing a zeolite structure according to the sixth aspect is provided, wherein the metal ion is at least one kind selected from the group consisting of iron ion, copper ion and silver ion.

According to an eighth aspect of the present invention, the method for producing a zeolite structure according to the seventh aspect is provided, wherein the metal ion contains at least iron ion and copper ion.

According to a ninth aspect of the present invention, the method for producing a zeolite structure according to any of sixth to eighth aspects is provided, wherein the ion-exchange treatment with a metal ion, to the tired honeycomb-shaped body is conducted a plurality of times and the kind of the metal ion used in at least one time of ion-exchange treatment is different from the kind of the metal ion used in remaining ion-exchange treatment.

According to a tenth aspect of the present invention, the method for producing a zeolite structure according to the ninth aspect is provided, wherein, in the ion-exchange treatment of a plurality of times, the final ion-exchange treatment is an ion-exchange treatment only for the surface portion of the partition wall and the remaining ion-exchange treatment is an ion-exchange treatment for the surface portion and inner portion of the partition wall.

According to an eleventh aspect of the present invention, the method for producing a zeolite structure according to the tenth aspect is provided, wherein the ion-exchange treatment is conducted using a metal ion-containing solution and the metal ion concentration in the solution is the same in all the ion-exchange treatments conducted a plurality of times, and, in the ion-exchange treatments conducted a plurality of times, the time length of final ion-exchange treatment is ½ or less relative to the total time length of remaining ion-exchange treatment.

According to a twelfth aspect of the present invention, the method for producing a zeolite structure according to the tenth aspect is provided, wherein the ion-exchange treatment is conducted using a metal ion-containing solution and, in the ion-exchange treatment of a plurality of times, the metal ion concentration in the metal ion-containing solution used in final ion-exchange treatment is ½ or less relative to the metal ion concentration in the metal ion-containing solution used in remaining ion-exchange treatment.

Effect of the Invention

The zeolite structure of the present invention has partition walls composed of a zeolite ion-exchanged with a metal ion and has a honeycomb shape, wherein the content per unit zeolite amount of the metal ion in the surface portion of the partition wall is larger than the content per unit zeolite amount of the metal ion in the inner portion of the partition wall. Therefore, in treating an exhaust gas with the zeolite structure, the metal ion is present in a large amount around the surface of each partition wall where a major portion of the exhaust gas is treated (passes) and is present in a small amount in the inner portion of the partition wall where the penetration amount of the exhaust gas is small; accordingly, the metal ion can be utilized efficiently for NOx treatment.

In the method for producing a zeolite structure, according to the present invention, a zeolite not ion-exchanged with any metal ion is extruded to obtain a honeycomb-shaped body; the honeycomb-shaped body is fired; and the fired honeycomb-shaped body is ion-exchanged with a metal ion. Therefore, the ion-exchanged zeolite is not exposed to a binder or high-temperature steam, and the movement and removal of metal ion in zeolite and the destruction of zeolite structure can be prevented, leading to the prevention of reductions in catalytic activity and adsorbability. Further, in the method for producing a zeolite structure, according to the present invention, a zeolite not ion-exchanged with any metal ion is extruded to obtain a honeycomb-shaped body; the honeycomb-shaped body is fired; and the fired honeycomb-shaped body is ion-exchanged with a metal ion. Therefore, there can be produced a zeolite structure wherein the content per unit zeolite amount of the metal ion penetrated from the surface of the partition wall and present in the surface portion thereof is larger than the content per unit zeolite amount of the metal ion penetrated from the surface of the partition wall and present in the inner portion thereof.

DETAILED DESCRIPTION OF THE INVENTION

Figure 1:
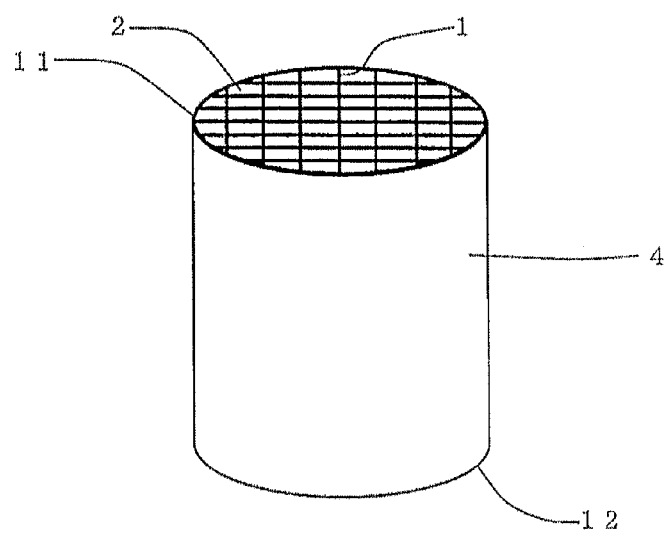
FIG. 1 is a perspective view schematically showing an embodiment of the zeolite structure of the present invention.

Next, the mode for carrying out the present invention is described in detail referring to the drawings. However, the present invention is in no way restricted to the following embodiment, and it should be construed that design change, modification, etc. can be added appropriately based on the ordinary knowledge possessed by those skilled in the art, as long as there is no deviation from the scope of the present invention.

(1) Zeolite Structure

Figure 2:
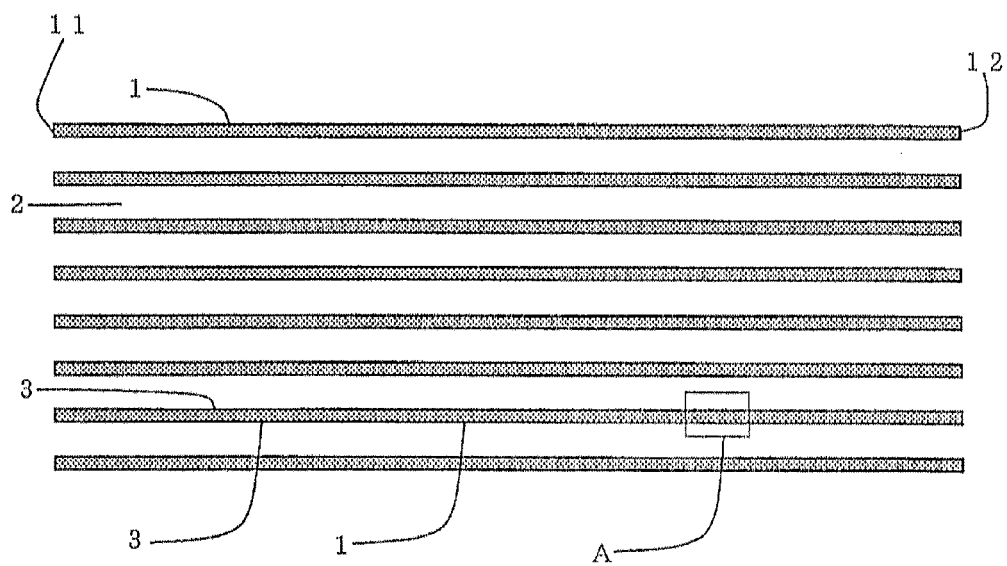
FIG. 2 is a schematic view showing a section parallel to the central axis of zeolite structure, of an embodiment of the zeolite structure of the present invention.
Figure 3:
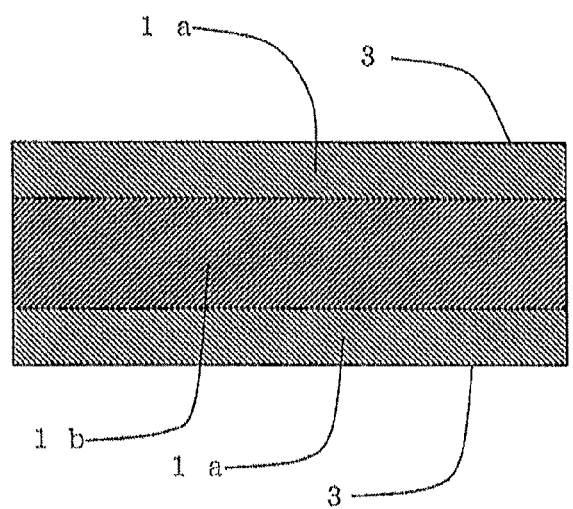
FIG. 3 is an enlarged view of the portion A of FIG. 2.

An embodiment of the zeolite structure of the present invention, as shown in FIG. 1 to FIG. 3, has partition walls 1 composed of a zeolite ion-exchanged with a metal ion and forming a plurality of cells 2 extending from one end face of the zeolite structure to its other end face and functioning as a passage of fluid and has a honeycomb shape, wherein the "content per unit zeolite amount of the metal ion in the surface portion 1a of the partition wall 1" is larger than the "content per unit zeolite amount of the metal ion in the inner portion 1b of the partition wall 1". Here, "the surface portion 1a of the partition wall 1" is a portion ranging from the surface 3 of the partition wall 1 to a depth of the partition wall 1, equivalent to 25% of the partition wall thickness. As shown in FIG. 3, each partition wall 1 has two kinds of portion 1a, one is located at the surface side of partition wall 1 and the other is located at the other surface side of partition wall 1. "The inner portion 1b of the partition wall 1" is a portion which is the whole partition wall 1 minus the two surface portions 1a, and is a portion whose center is at the midpoint of the thickness of the partition wall 1 and which occupies 50% of the thickness of the partition wall. In addition, the amount (content) of the metal ion is an amount of material (molar number). The "zeolite amount" is the total amount (mole) of the "amount of material (molar number) of silicon (Si)" and the "amount of material (molar number) of aluminum (Al)" contained in (constituting) the zeolite. The metal ion amount and the zeolite amount may be shown as the amounts per unit volume. In addition, the "content per unit zeolite amount of the metal ion in the surface portion 1a of the partition wall 1" is a value obtained by dividing the amount of material (molar number) of the metal ion contained in the surface portion 1a of the partition wall 1 by the zeolite amount in the surface portion 1a of the partition wall 1 (the total amount (mole) of the "amount of material (molar number) of silicon (Si)" and the "amount of material (molar number) of aluminum (Al)"). Likewise, the "content per unit zeolite amount of the metal ion in the inner portion 1b of the partition wall 1" is a value obtained by dividing the amount of material (molar number) of the metal ion contained in the inner portion 1b of the partition wall 1 by the zeolite amount in the inner portion 1b of the partition wall 1 (the total amount (mole) of the "amount of material (molar number) of silicon (Si)" and the "amount of material (molar number) of aluminum (Al)"). FIG. 1 is a perspective view schematically showing en embodiment of the zeolite structure of the present invention. FIG. 2 is a schematic view showing a section parallel to the central axis of zeolite structure, of an embodiment of the zeolite structure of the present invention. FIG. 3 is an enlarged view of the portion A of FIG. 2, and is a schematic view showing, in an enlarged state, a part of partition wall in a section parallel to the central axis of zeolite structure, of an embodiment of the zeolite structure of the present invention.

Thus, the zeolite structure 100 of the present embodiment has partition walls 1 composed of a zeolite ion-exchanged with a metal ion and has a honeycomb shape, wherein the content (mole) per unit zeolite amount (mole), of the metal ion in the surface portion 1a of the partition wall 1 is larger than the content (mole) per unit zeolite amount of the metal ion in the inner portion 1b of the partition wall 1. Therefore, in treating an exhaust gas with the zeolite structure, the metal ion is present in a large amount around the surface (in the surface portion 1a) of each partition wall 1 where a major portion of the exhaust gas is treated, and is present in a small amount in the inner portion 1b of the partition wall 1 where the penetration amount of the exhaust gas is small; accordingly, the metal ion can be utilized efficiently for NOx treatment.

In the zeolite structure 100 of the present embodiment, the content per unit zeolite amount of the metal ion in the surface portion 1a of the partition wall 1 is preferably 1.1 to 5.0 times, more preferably 1.3 to 3.0 times the content per unit zeolite amount of the metal ion in the inner portion 1b of the partition wall 1. When the content of the metal ion in the surface portion 1a is smaller than 1.1 times, the content of the metal ion in the inner portion 1b is large and accordingly the metal ion in the inner portion 1b may not be used efficiently for exhaust gas purification. When the content of the metal ion in the surface portion 1a is larger than 5.0 times, the content of the metal ion in the inner portion 1b is small, and accordingly the exhaust gas penetrated into the inner portion 1b may be hardly purified in the inner portion 1b.

The content (mole) per unit zeolite amount of the metal ion in the surface portion 1a of the partition wall 1 and the content (mole) per unit zeolite amount of the metal ion in the inner portion 1b of the partition wall 1 are measured by the following method. First, a 30 mm×30 mm portion is cut out from one partition wall of a zeolite structure, and chemical analysis is conducted for the portion to determine the metal ion content (mol/cm$^3$) of the whole partition wall 1. Wet analysis is used for the chemical analysis. Next, two surface portions 1a of the partition wall 1 are scraped off to leave the inner portion 1b of the partition wall 1. The thus-obtained inner portion 1b of the partition wall 1 is subjected to chemical analysis to determine the metal ion content (mol/cm$^3$). From the metal ion content (mol/cm$^3$) of the whole partition wall 1 and the metal ion content (mol/cm$^3$) of the inner portion 1b of the partition wall 1 is determined the metal ion content (mol/cm$^3$) of the surface portion 1a of the partition wall 1. The scraping-off of the surface portions 1a from the partition wall 1 is conducted preferably by using a sandpaper, a polishing machine or the like. In addition, in the zeolite, silicon elements in a part of the tetrahedral framework of silica (SiO$_2$) are substituted by aluminum elements, and metal ions are held in order to maintain electroneutrality. All the metal ions may be present in the ion-exchange sites in the framework in order to maintain neutrality of the zeolite structure, or part of metal ions may be present in the vicinity of the zeolite framework in the form of, for example, oxides. In addition, the zeolite amount can be calculated from the proportion of the mass of the zeolite with respect to the mass of the entire partition walls and the contents of the silicon elements and the aluminum elements in the zeolite used as the raw material, and the resultant value is converted into a value per unit volume to calculate the zeolite amount (mole/cm$^3$) per unit volume. In addition, it is also possible to quantify the silicon elements and the aluminum elements by chemical analysis of the partition wall portion. However, when a component other than zeolite, for example, a forming aid contains a silicon element or an aluminum element, it is necessary to eliminate the contribution of the component to calculate the zeolite amount. In addition, by dividing the "content (mole/cm$^3$)" of the metal ion contained in the surface portion 1a of the partition wall 1" by the "zeolite amount (mole/cm$^3$) in the surface portion 1a of the partition wall 1", the "content per unit zeolite amount of the metal ion in the surface portion 1a of the partition wall 1" can be obtained. In addition, by dividing the "content (mole/cm$^3$)" of the metal ion contained in the inner portion 1b of the partition wall 1" by the "zeolite amount (mole/cm$^3$) in the inner portion 1b of the partition wall 1", the "content per unit zeolite amount of the metal ion in the inner portion 1b of the partition wall 1" can be obtained. In addition, it is preferable that the "content (mole/cm$^3$) per unit zeolite amount of the metal ion per unit volume of the surface portion 1a of the partition wall 1" is larger than the "content (mole/cm$^3$) per unit zeolite amount of the metal ion per unit volume of the inner portion 1b of the partition wall 1".

Preferably, the metal ion in the surface portion 1a of the partition wall 1 is at least one kind selected from the group consisting of iron ion, copper ion and silver ion and the metal ion in the inner portion 1b of the partition wall 1 is at least one kind selected from the group consisting of iron ion, copper ion and silver ion. By selecting the metal ion as such a kind, good NOx purification performance is provided by iron ion and copper ion and good hydrocarbon adsorption capability can be exhibited by copper ion and silver ion. Also preferably, the main metal ion in the surface portion 1a of the partition wall 1 and the metal ion in the inner portion 1b of the partition wall 1 are different from each other. Here, "the main metal ion" means a metal ion present by at least 60 mass % relative to the total metal ions. Also preferably, the main metal in the surface portion 1a of the partition wall 1 is iron ion and the main metal ion in the inner portion 1b of the partition wall 1 is copper ion. When the main metal ion in the surface portion 1a of the partition wall 1 is iron ion, the partition wall 1 shows high resistances to the degradation of catalytic activity and adsorption capability in an atmosphere of high-temperature steam or poisonous gas. Also, when the main metal ion in the inner portion 1b of the partition wall 1 is copper ion, good catalytic activity and adsorption capability can be exhibited despite the presence of the copper ion in the inner portion 1b.

In the zeolite structure 100 of the present embodiment, the sectional area in a section perpendicular to the direction in which each cell 2 extends, is preferably 300 to 200,000 mm$^2$. When the sectional area is smaller than 300 mm$^2$, the area in which an exhaust gas can be treated may be small and the pressure loss is high. When the sectional area is larger than 200,000 mm$^2$, the strength of the zeolite structure 100 may be low.

As the kind of the zeolite constituting the zeolite structure 100 of the present embodiment, there can be mentioned ZSM-5, β-zeolite, ZSM-11, chabazite, ferrierite, etc. Of these, ZSM-5 and β-zeolite are preferred because they have good purification performance and good adsorption capability.

The porosity and pore diameter of the zeolite constituting the zeolite structure 100 of the present embodiment are needed to be considered from two aspects. The first aspect relates to the pore of zeolite. Since zeolite is a substance having pores as a crystal structure, the pore diameter differs depending upon the kind of zeolite and a particular zeolite has a particular pore diameter. For example, ZSM-5 has pores of oxygen 10-membered ring and its pore diameter is about 5 to 6 Å. β-zeolite has pores of oxygen 12-membered ring and its pore diameter is about 5 to 7.5 Å. The second aspect relates to the "pores formed among the zeolite crystal grains" as the pores are formed among the zeolite crystal grains because the zeolite structure is an integral body of zeolite crystal grains and a binder. For the second aspect, the porosity and pore diameter of zeolite as a zeolite structure can be employed. In the zeolite structure of the present embodiment, regarding the "pores formed among the zeolite crystal grains", the porosity is preferably 20 to 70%, and the average pore diameter is preferably 0.01 to 10 μm.

The zeolite structure 100 of the present embodiment preferably has, as shown in FIG. 1, an outer peripheral wall 4 provided so as to surround the periphery of the whole partition walls 1. The material of the outer peripheral wall need not be the same material as used for the partition wall; however, it is preferred that the material of the outer peripheral wall contains mainly the same material or contains mainly a material of equivalent properties because, when the material of the outer peripheral wall is largely different in properties such as heat resistance and thermal expansion coefficient, there may arise partition wall breakage, etc. The outer peripheral wall may be formed integrally with the partition walls by extrusion, or by processing the grinding of peripheral portion into an intended shape and then coating the peripheral portion of the intended shape.

There is no particular restriction as to the cell shape of honeycomb segment constituting the zeolite structure 100 of the present embodiment, i.e. the cell shape in a section of zeolite structure perpendicular to the central axis direction (cell-extending direction) of the zeolite structure. As the cell shape, there can be mentioned, for example, a triangle, a tetragon, a hexagon, an octagon, a circular and a combination thereof.

The partition wall thickness of the zeolite structure of the present embodiment is preferably 50 μm to 2 mm, more preferably 100 μm to 1 mm. When the partition wall thickness is smaller than 50 μm, the zeolite structure may have a low strength. When the partition wall thickness is larger than 2 mm, the pressure loss when a gas passes through the zeolite structure, may be large. The thickness of the outer peripheral wall 4 constituting the outermost portion of the zeolite structure of the present embodiment is preferably 10 mm or smaller. When the thickness is larger than 10 mm, the area capable of conducting exhaust gas purification treatment may be small.

The cell density of the zeolite structure of the present embodiment is not particularly restricted. However, the cell density is preferably 50 to 1,000 cells/inch$^2$ (7.8 to 155.0 cells/cm$^2$), more preferably 200 to 600 cells/inch$^2$ (31.0 to 93.0 cells/cm$^2$). When the cell density is larger than 1,000 cells/inch$^2$, the pressure loss when a gas passes through the zeolite structure may be large. When the cell density is smaller than 50 cells/inch$^2$, the area capable of conducting exhaust gas purification treatment may be small.

As to the overall shape of the zeolite structure of the present embodiment, there is no particular restriction. The overall shape may be a desired shape such as cylinder, oval or the like. As to the size of the zeolite structure, when the shape is, for example, cylindrical, the diameter of the bottom is preferably 20 to 500 mm, more preferably 70 to 300 mm; and the length in the central axis direction of zeolite structure is preferably 10 to 500 mm, more preferably 30 to 300 mm.

(2) Method for Production of Zeolite Structure

Next, description is made on an embodiment of the method for producing a zeolite structure, according to the present invention. By this embodiment of the method for producing a zeolite structure, according to the present invention is produced the above-mentioned embodiment of the zeolite structure of the present invention.

The method for producing a zeolite structure, of the present embodiment comprises extruding a forming material comprising a zeolite powder and a forming aid, to form a honeycomb-shaped body which has partition walls forming a plurality of cells extending from one end face of the honeycomb-shaped body to its other end face and functioning as a passage of fluid, firing the honeycomb-shaped body, and subjecting the fired honeycomb-shaped body (honeycomb-shaped structure) to an ion exchange treatment with a metal ion, to produce a zeolite structure wherein the content per unit zeolite amount of the metal ion in the surface portion of the partition wall is larger than the content per unit zeolite amount of the metal ion in the inner portion of the partition wall. The above-mentioned honeycomb-shaped structure has a shape of a zeolite structure 100 shown in FIG. 1 and FIG. 2.

Thus, in the method for producing a zeolite structure, of the present embodiment, a zeolite not ion-exchanged with any metal ion is extruded to form a honeycomb-shaped body; the honeycomb-shaped body is fired to obtain a fired honeycomb-shaped body; the fired honeycomb-shaped body is exposed to an ion exchange treatment. Therefore, the ion-exchanged zeolite is not subjected to a binder or high-temperature steam and there is no movement and removal of metal ion in zeolite or the destruction of zeolite structure; accordingly, there is no reduction in catalytic activity or adsorption capability. Further, in the method for producing a zeolite structure of the present embodiment, a zeolite not ion-exchanged with any metal ion is extruded to obtain a honeycomb-shaped body; the honeycomb-shaped body is fired; and the fired honeycomb-shaped body is ion-exchanged with a metal ion. Therefore, there can be produced the above-mentioned zeolite structure of the present invention wherein the content per unit zeolite amount of the metal ion penetrated from the surface of the partition wall and present in the surface portion thereof is larger than the content per unit zeolite amount of the metal ion penetrated from the surface of the partition wall and present in the inner portion thereof.

More detailed description is made below on the method for producing a zeolite structure of the present embodiment.

First, a forming material comprising a zeolite powder and a forming aid is extruded to form a honeycomb-shaped body which has partition walls forming a plurality of cells extending from one end face of the honeycomb-shaped body to other end face thereof and functioning as a passage of fluid.

The forming material is prepared by mixing a zeolite powder, a forming aid, etc.

As the kind of the zeolite powder, there can be mentioned ZSM-5 powder, β-zeolite powder, ZSM-11 powder, chabazite powder, ferrierite powder, etc. Of these, preferred are ZSM-5 powder and β-zeolite powder because they have good purification performance and good adsorption capability. The average particle diameter of the zeolite powder is preferably 0.1 to 20 μm. The average particle diameter of the zeolite powder is a value obtained by laser diffractometry. The zeolite powder used in the method for producing a zeolite structure, of the present embodiment is a zeolite powder not subjected to an ion exchange treatment with any metal ion.

As the forming aid, there can be mentioned an alumina sol, montmorillonite, etc. The content of the alumina sol in the forming aid is preferably 5 to 50 mass parts relative to 100 mass parts of the zeolite powder. The content of the montmorillonite in the forming aid is preferably 5 to 50 mass parts relative to 100 mass parts of the zeolite powder.

Preferably, the forming aid contains water. The content of the water in the forming aid is preferably 30 to 70 mass parts relative to 100 mass parts of the zeolite powder.

There is no particular restriction as to the method for mixing the zeolite power, the forming aid, etc., and a known method can be used. There is preferred, for example, a method of using a mixer such as Loedige mixer or the like.

Then, the forming material is kneaded to form a columnar body. As to the method for kneading a forming material to form a columnar body, there is no particular restriction. There can be mentioned, for example, a method using a kneader, a vacuum pugmill or the like.

Then, the columnar body is extruded to form a honeycomb-shaped body (formed article of a honeycomb shape) such as zeolite structure 100 shown in FIG. 1. The honeycomb-shaped body has partition walls forming a plurality of cells extending from one end face of the honeycomb-shaped body to other end face thereof and functioning as a passage of fluid. In the extrusion, there is preferably used a die having a structure corresponding with the overall shape, cell shape, partition wall thickness, cell density, etc. of a honeycomb-shaped body to be manufactured. The material of the die is preferably an abrasion-resistant metal.

Preferably, the honeycomb-shaped body is subjected to drying, before being fired. As to the method for drying, there is no particular restriction; and there can be mentioned, for example, drying by electromagnetic wave heating, such as microwave heating drying, high-frequency induction heating drying or the like, and drying by external heating, such as hot-air drying, super-heated steam drying or the like. Of these, preferred is a drying method which comprises removing a certain amount of water by electromagnetic heating and then removing the residual water by external heating, because the method can dry the whole honeycomb-shaped body rapidly and uniformly with no formation of crack.

Also preferably, the honeycomb-shaped body is subjected to calcination before being fired. The calcination is conducted for debindering, and there is no particular restriction as to the calcination method. Any calcination method can be used as long as the organic substances (e.g. organic binder or dispersing agent) in the honeycomb-shaped body can be removed. Preferred calcination conditions are heating at about 200 to 1,000° C. for about 3 to 100 hours in an oxidizing atmosphere.

Then, the honeycomb-shaped body is fired to obtain a honeycomb-shaped structure. Accordingly, "a fired honeycomb-shaped body" is "a honeycomb-shaped structure". There is no particular restriction as to the method for firing. The firing can be conducted using an electric furnace, a gas furnace, or the like. Preferred firing conditions are heating at 500 to 900° C. for 1 to 10 hours in the air.

Then, the fired honeycomb-shaped body is subjected to an ion exchange treatment with a metal ion, to preferably obtain "a zeolite structure wherein the content per unit zeolite amount of the metal ion in the surface portion of the partition wall is larger than the content per unit zeolite amount of the metal ion in the inner portion of the partition wall".

Thus, in the method for producing a zeolite structure of the present embodiment, a honeycomb-shaped structure is formed from a zeolite subjected to no ion exchange treatment and then is subjected to an ion exchange treatment with a metal ion. Since the metal ion penetrates from the surface of the partition wall into the inner portion of the partition wall, the amount of metal ion is large in the surface of the partition wall of honeycomb-shaped structure and small in the inner portion of the partition wall. As a result, there can be obtained "a zeolite structure wherein the content per unit zeolite amount of the metal ion in the surface portion of the partition wall is larger than the content per unit zeolite amount of the metal ion in the inner portion of the partition wall".

In the method for producing a zeolite structure of the present embodiment, it is preferred that the metal ion is at least one kind selected from the group consisting of iron ion, copper ion and silver ion. Also, when it is intended to purify NOx, it is preferred that the metal ion contains at least iron ion and copper ion. When it is intended to adsorb hydrocarbons, it is preferred that the metal ion contains at least silver ion and copper ion.

The following method can be mentioned for subjecting the fired honeycomb-shaped body to an ion exchange treatment with a metal ion.

There is prepared an ion exchange solution containing a metal ion for ion exchange, i.e. a metal ion-containing solution. An aqueous solution of silver nitrate or silver acetate is prepared when ion exchange is conducted with, for example, silver ion. An aqueous solution of copper acetate, copper sulfate or copper nitrate is prepared when ion exchange is conducted with copper ion. An aqueous solution of iron sulfate or iron acetate is prepared when ion exchange is conducted with iron ion. The metal ion concentration of the ion exchange solution is preferably 0.005 to 0.5 mol/liter. Then, in the ion exchange solution is immersed the honeycomb-shaped structure formed from zeolite. The time of the immersion can be determined appropriately depending upon, for example, the amounts of metal ion ion-exchanged in the surface portion and inner portion of partition wall. Then, it is preferred that the honeycomb-shaped structure is taken out of the ion exchange solution, dried and calcinated to obtain a zeolite structure. Preferred drying conditions are 80 to 150° C. and 1 to 10 hours. Preferred calcination conditions are 400 to 600° C. and 1 to 10 hours.

It is preferred that the ion exchange treatment with a metal ion is conducted a plurality of times to the fired honeycomb-shaped body (honeycomb-shaped structure) and that the kind of the metal ion used in "at least one time" of ion-exchange treatment is different from the kind of the metal ion used in "remaining" ion-exchange treatment. Thus, in the ion exchange treatment conducted a plurality of times, the kind of the metal ion used in "at least one time" of ion-exchange treatment is allowed to be different from the kind of the metal ion used in "remaining" ion-exchange treatment, whereby a zeolite structure containing plural kinds of metal ions can be obtained.

It is further preferred that, when the ion exchange treatment is conducted a plurality of times to the fired honeycomb-shaped body, the final ion-exchange treatment is an ion-exchange treatment only for the surface portion of the partition wall and the remaining ion-exchange treatment is an ion-exchange treatment for the surface portion and inner portion of the partition wall. Thus, among a plurality of the ion exchange treatment, by conducting ion exchange only for the surface portion of the partition wall in the final ion exchange treatment, it is possible to make different the conditions of ion exchange (the kind and content of metal ion) between the surface portion of the partition wall and the inner portion of the partition wall. As a result, there can be obtained very easily "a zeolite structure wherein the content per unit zeolite amount of the metal ion in the surface portion of the partition wall is larger than the content per unit zeolite amount of the metal ion in the inner portion of the partition wall".

When the ion exchange treatment is conducted using a metal ion-containing solution (an ion exchange solution) and is conducted a plurality of times to a fired honeycomb-shaped body, the metal ion concentration in the metal ion-containing solution is the same in all the ion-exchange treatments conducted a plurality of times and, in the ion-exchange treatments of a plurality of times, the time length of final ion-exchange treatment is preferably ½ or less, more preferably ¹/₁₀ to ½ relative to the total time length of remaining ion-exchange treatment. As a result, there can be obtained very easily "a zeolite structure wherein the content per unit zeolite amount of the metal ion in the surface portion of the partition wall is larger than the content per unit zeolite amount of the metal ion in the inner portion of the partition wall".

When the ion exchange treatment is conducted using a metal ion-containing solution (an ion exchange solution) and is conducted a plurality of times to a fired honeycomb-shaped body, the metal ion concentration of the metal ion-containing solution used in final ion-exchange treatment is preferably ½ or less, more preferably ¹/₁₀ to ½ relative to the metal ion concentration of the metal ion-containing solution used in remaining ion-exchange treatment. As a result, there can be obtained very easily "a zeolite structure wherein the content per unit zeolite amount of the metal ion in the surface portion of the partition wall is larger than the content per unit zeolite amount of the metal ion in the inner portion of the partition wall".

When the ion exchange treatment is conducted a plurality of times to a fired honeycomb-shaped body, drying and calcination may be conducted to each honeycomb-shaped structure taken out of each ion-exchange solution after ion exchange.

EXAMPLES

The present invention is described below more specifically by way of Examples. However, the present invention is in no way restricted by these Examples.

Example 1

ZSM-5 having a ratio of the silica amount (mole) to the alumina amount (mole) ($SiO_2/Al_2O_3$ (molar ratio)) of 30 was used as a zeolite powder. The zeolite powder had an average particle diameter of 13 μm. The average particle diameter is a value obtained using a laser diffraction/scattering type grain size analyzer. To the zeolite powder were added, as a forming aid, methyl cellulose, boehmite and a dispersing agent. Further, water was added, followed by mixing, to obtain a fluid mixture. As the dispersing agent, potassium laurate soap was used. The content of the methyl cellulose in the mixture was 5 mass parts relative to 100 mass parts of the zeolite powder. The content of the boehmite in the mixture was 30 mass parts relative to 100 mass parts of the zeolite powder. The content of the dispersing agent was 0.5 mass parts relative to 100 mass parts of the zeolite powder. The content of water in the mixture was 55 mass parts relative to 100 mass parts of the zeolite powder. The mixture was kneaded using a vacuum pugmill to form a columnar body, and the columnar body was extruded to obtain a honeycomb-shaped body.

Next, the honeycomb-shaped body was dried, debindered and fired to obtain a honeycomb-shaped structure. The drying conditions were drying at 40° C. for 8 hours and then at 120° C. for 48 hours. The debindered conditions were 450° C. and 5 hours. The firing conditions were 650° C. and 5 hours. The honeycomb-shaped structure after firing had a shape of quadrangular prism having a square bottom of 30 mm×30 mm and a length of 150 mm in central axis direction. The honeycomb-shaped structure also had a partition wall thickness of 0.3 mm and a cell density of 300 cells/inch² (46.5 cells/cm²).

Then, the honeycomb-shaped structure was subjected to an ion exchange treatment with a metal ion. The honeycomb-shaped structure was immersed in an aqueous solution containing 0.2 mol/liter of iron sulfate (a metal ion-containing solution). The time length of immersion was 1 hour. Then, the structure was taken out of the metal ion-containing solution and immersed once more in an aqueous iron sulfate solution of the same concentration.

Then, the honeycomb-shaped structure was taken out of the metal ion-containing solution, dried at 100° C. for 3 hours, and calcinated at 500° C. for 3 hours to obtain a honeycomb-shaped zeolite structure.

The zeolite structure was examined for "Metal ion distribution" and "NOx purification performance" by the following methods. The results are shown in Table 1. In Table 1, "After extrusion" in the column of "Ion exchange" means that an ion exchange treatment with a metal ion was conducted after extrusion to form a honeycomb-shaped structure. "Powder state" means that a honeycomb-shaped body was formed using a zeolite powder subjected to an ion exchange treatment with a metal ion and no ion exchange treatment was not conducted for the honeycomb-shaped body. "$SiO_2/Al_2O_3$ ratio" means a $SiO_2$ molar ratio to $Al_2O_3$ in zeolite powder. "Metal ion" means a metal ion contained in a zeolite structure as a result of an ion exchange treatment. "Fe" means iron ion and "Cu" means copper ion. "Surface portion: Fe" means that the main metal ion contained in the surface portion of partition wall is iron ion; "Inner portion: Cu" means that the main metal ion contained in the inner portion of partition wall is copper ion; and "Cu, Fe uniform" means that copper ion and iron ion are contained uniformly in the whole portion of partition wall. "Total amount of metal ion" means the ratio of the mass of the entire partition walls containing metal ion to the mass of the metal ion in the entire partition walls. The column of "surface portion: inner portion (based on volume)" shows the molar ratio of the content (mole/cm³) per unit volume of the metal ion contained in the "surface portion" of partition wall to the content (mole/cm³) per unit volume of the metal ion contained in the "inner portion" of partition wall. In addition, the column of "surface portion: inner portion (based on zeolite amount)" of the "metal ion distribution" shows the ratio of the "content (mole) per unit zeolite amount of the metal ion contained in the "surface portion" of partition wall" to the "content (mole) per unit zeolite amount of the metal ion contained in the "inner portion" of partition wall".

(Metal Ion Distribution)

A 30 mm×30 mm portion is cut out from one partition wall of a zeolite structure, and chemical analysis is conducted for the portion to determine the metal ion content (mol/cm³) of the whole partition wall. Wet analysis is used for the chemical analysis. Next, two surface portions of the partition wall are scraped off using a sandpaper to leave only the inner portion of the partition wall. The thus-obtained inner portion of the partition wall is subjected to chemical analysis to determine the metal ion content (mol/cm³) per unit volume. From the metal ion content (mol/cm³) per unit volume of the whole partition wall and the metal ion content (mol/cm³) per unit volume of the inner portion of the partition wall is determined the metal ion content (mol/cm³) per unit volume of the surface portion of the partition wall. Then, the "metal ion content (mol/cm³) per unit volume of the surface portion of the partition wall" is compared with the "metal ion content (mol/ cm³) per unit volume of the inner portion of the partition wall" (surface portion: inner portion (based on volume)). Further, the total amount of the silicon elements and aluminum elements in the zeolite is calculated from the amount of the zeolite powder used as the raw material and the "content ratio (molar ratio) of the silica ($SiO_2$) and alumina ($Al_2O_3$) in the zeolite powder", and the value obtained by the calculation is converted into a value per unit volume to obtain a zeolite amount (mol/cm³) per unit volume of the surface portion and the inner portion of the partition wall. Then, the "value obtained by dividing the metal ion content (mol/cm³) per unit volume of the surface portion of the partition wall by the zeolite amount (mol/cm³) per unit volume of the surface portion of the partition wall" is compared with the "value obtained by dividing the metal ion content (mol/cm³) per unit volume of the inner portion of the partition wall by the zeolite amount (mol/cm³) per unit volume of the inner portion of the partition wall" (surface portion: inner portion (based on zeolite amount)).

(NOx Purification Performance)

A test gas is passed through a zeolite structure and the exhaust gas discharged from the zeolite structure is analyzed for NOx amount by a gas analyzer. There are employed the data when the temperature of the test gas entering the zeolite structure was set at 200° C. and the data when the temperature was set at 300° C. As the zeolite structure, there is used a zeolite structure cut out into a cylindrical shape of 1 inch (about 2.54 cm) in bottom diameter and 2 inches (about 5.08 cm) in length of central axis direction (length in cell extension direction). The temperatures of the zeolite structure and the test gas are controlled by a heater. An infrared image furnace is used as the heater. As the test gas, there is used a mixed gas obtained by mixing, into nitrogen, 5 volume % of carbon dioxide, 14 volume % of oxygen, 350 ppm (by volume) of nitrogen monoxide, 350 ppm (by volume) of ammonia and 10 volume % of water. Incidentally, the test gas is obtained by beforehand preparing water and a mixed gas of other gases separately and, in conducting the test, mixing them in a test tube. "MEXA 9100 EGR" (a product of HORIBA, Ltd.) is used as the gas analyzer. The flux when the test gas enters the zeolite structure, is set at 5,000 hr⁻¹. In Table 1 is shown NOx purification ratio (%) as "NOx purification performance". The NOx purification ratio is a value obtained by subtracting the NOx amount of exhaust gas discharged from zeolite structure from the NOx amount of test gas, dividing the difference by the NOx amount of test gas, and multiplying the quotient by 100.

(HC (Hydrocarbon) Adsorbability)

Figure 4:
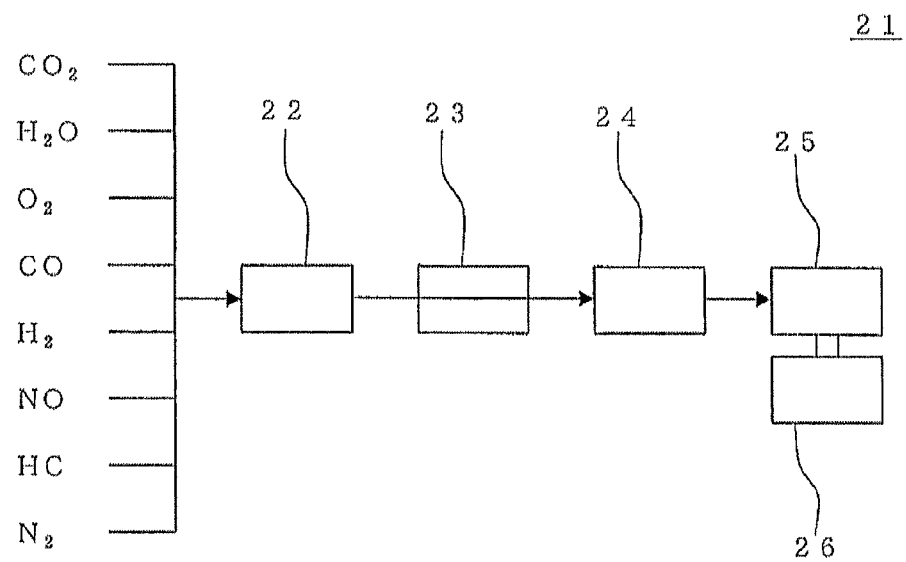
FIG. 4 is a flow chart schematically showing a test equipment for HC adsorbability.

The HC (hydrocarbon) adsorption capability (hydrocarbon adsorption ratio) of a zeolite structure is examined using "HC adsorption capability test equipment 21" shown in FIG. 4. Carbon dioxide, water ($H_2O$), oxygen ($O_2$), carbon monoxide (CO), hydrogen ($H_2$), nitrogen monoxide (NO), hydrocarbon (HC) and nitrogen ($N_2$) are fed from respective gas bombs; they are mixed by a mixer 22 to prepare a test gas; the test gas is heated by a heater 23; the heated test gas is passed through a zeolite structure 24 to give rise to adsorption; the exhaust gas discharged from the zeolite structure 24 is measured for hydrocarbon amount for 150 seconds (from the start of the passing) by an analyzer 25. Toluene was used as the hydrocarbon. The test gas is allowed to enter the zeolite structure at 17 NL/min (NL: normal liter). The measurement was conducted when the temperatures of the test gas entering the zeolite structure were 60° C. and 180° C. FIG. 4 is a flow chart schematically showing the HC adsorption capability test equipment. In FIG. 4, the flow of gas is shown by arrows. In the analyzer 25, analysis is made by analytical device (a computer) 26. MEXA 9100 EGR (a product of HORIBA, Ltd.) was used as the analyzer 25. The contents of the components contained in the test gas were 16 volume % (carbon dioxide), 10 volume % (water $H_2O$), 0.77 volume % (oxygen $O_2$), 2 volume % (carbon monoxide CO), 0.38 volume % (hydrogen $H_2$), 2,000 ppm (by volume) (nitrogen monoxide NO), 5,000 ppm C (value multiplying the number of carbons contained in the hydrocarbon, by volume) (hydrocarbon HC), and the remainder (nitrogen $N_2$). Toluene was used as the hydrocarbon. Hydrocarbon adsorption ratio is determined as follows. A honeycomb structure having the same shape as the above-mentioned zeolite structure and composed of zeolite is measured for the hydrocarbon amount B discharged from the honeycomb structure using the above-mentioned "HC adsorption capability test equipment 21". From the hydrocarbon amount B is deducted the hydrocarbon amount A obtained using the zeolite mixture. The difference (B−A) is divided by the hydrocarbon amount B and the value [(B−A)/B]×100 is taken as hydrocarbon adsorption ratio (vol %).

TABLE 1

| | Ion exchange | Kind of zeolite | $SiO_2/Al_2O_3$ ratio | Metal ion | Total amount of metal ion (mass %) | Metal ion distribution Surface portion:inner portion (based on volume) (molar ratio) | Surface portion:inner portion (based on zeolite amount) (molar ratio) | NOx purification performance (%) 200° C. | NOx purification performance (%) 300° C. |
|---|---|---|---|---|---|---|---|---|---|
| Ex. 1 | After extrusion | ZSM-5 | 30 | Fe | 5.2 | 3.1:1 | 3.2:1 | 42 | 91 |
| Ex. 2 | After extrusion | ZSM-5 | 110 | Fe | 3.4 | 1.1:1 | 1.1:1 | 38 | 87 |
| Ex. 3 | After extrusion | β-zeolite | 30 | Fe, Cu (uniform) | 10.5 | 2.3:1 | 2.4:1 | 52 | 94 |
| Ex. 4 | After extrusion | β-zeolite | 60 | Surface portion: Fe Inner portion: Cu | 5.8 | 1.8:1 | 1.8:1 | 47 | 95 |
| Ex. 5 | After extrusion | ZSM-5 | 30 | Surface portion: Fe Inner portion: Cu | 8.8 | 3.1:1 | 3.2:1 | 53 | 96 |
| Ex. 6 | After extrusion | β-zeolite | 60 | Cu | 5.8 | 1.3:1 | 1.3:1 | 43 | 92 |
| Comp. Ex. 1 | Powder state | ZSM-5 | 60 | Fe | 2.8 | 0.98:1 | 0.98:1 | 28 | 75 |
| Comp. Ex. 2 | Powder state | β-zeolite | 60 | Cu | 5.6 | 0.48:1 | 0.47:1 | 35 | 82 |

TABLE 2

| | Ion exchange | Kind of zeolite | SiO$_2$/Al$_2$O$_3$ ratio | Metal ion | Total amount of metal ion (mass %) | Metal ion distribution | | Hydrocarbon absorption ratio (vol %) 60° C. | Hydrocarbon absorption ratio (vol %) 180° C. |
|---|---|---|---|---|---|---|---|---|---|
| | | | | | | Surface portion:inner portion (based on volume) (molar ratio) | Surface portion:inner portion (based on zeolite amount) (molar ratio) | | |
| Ex. 7 | After extrusion | ZSM-5 | 110 | Ag | 4.8 | 1.4:1 | 1.4:1 | 97 | 45 |
| Ex. 7 | After extrusion | ZSM-5 | 110 | Cu | 2.8 | 2.3:1 | 2.3:1 | 95 | 38 |
| Comp. Ex. 3 | Powder state | ZSM-5 | 110 | Cu | 3.8 | 0.78:1 | 0.78:1 | 93 | 18 |

Example 2

A zeolite structure was produced in the same manner as in Example 1 except that "SiO$_2$/Al$_2$O$_3$ ratio" was changed as shown in Table 1 and that, in the conditions of ion exchange treatment, the concentration of iron sulfate was changed to 0.05 mol/liter, the time length of ion exchange was changed to 5 hours, and the times of ion exchange were changed to 5 times. "Metal ion distribution" and "NOx purification performance" were examined in the same manner as in Example 1. The results are shown in Table 1.

Example 3

A zeolite structure was produced in the same manner as in Example 1 except that "Kind of zeolite" was changed to β-zeolite, the metal ion-containing solution used in ion exchange treatment was changed to an aqueous solution containing 0.02 mol/liter of copper sulfate and 0.04 mol/liter of iron sulfate, the time length of immersion of honeycomb-shaped structure in metal ion-containing solution was 1 hour, and the times of ion exchange were changed to 10 times. "Metal ion distribution" and "NOx purification performance" were examined in the same manner as in Example 1. The results are shown in Table 1.

Example 4

A zeolite structure was produced in the same manner as in Example 1 except that "kind of zeolite" was changed to β-zeolite and the ion exchange treatment was conducted as follows. "Metal ion distribution" and "NOx purification performance" were examined in the same manner as in Example 1. The results are shown in Table 1. In the ion exchange treatment, first, a honeycomb-shaped structure was immersed in a 0.2 mol/liter copper sulfate solution for 1 hour (this was conducted three times) and then was dried at 100° C. for 3 hours and calcinated at 500° C. for 3 hours. Further, the honeycomb-shaped structure was immersed in a 0.2 mol/liter iron sulfate solution for 1 hour, followed by drying at 100° C. for 3 hours and calcination at 500° C. for 3 hours.

Example 5

A zeolite structure was produced in the same manner as in Example 1 except that "Kind of zeolite" was changed to (3-zeolite and the ion exchange treatment was conducted as follows. "Metal ion distribution" and "NOx purification performance" were examined in the same manner as in Example 1. The results are shown in Table 1. In the ion exchange treatment, first, a honeycomb-shaped structure was immersed in a 0.15 mol/liter copper sulfate solution for 2 hours and then was dried at 100° C. for 3 hours and calcinated at 500° C. for 3 hours. Further, the honeycomb-shaped structure was immersed in a 0.4 mol/liter iron sulfate solution for 2 hours, followed by drying at 100° C. for 3 hours and calcination at 500° C. for 3 hours.

Example 6

A zeolite structure was produced in the same manner as in Example 1 except that "Kind of zeolite" was changed to β-zeolite, the metal ion-containing solution used in ion exchange treatment was changed to an aqueous solution containing 0.15 mol/liter of copper sulfate, the time length of immersion of honeycomb-shaped structure in metal ion-containing solution was changed to 3 hours, and the times of ion exchange were changed to 3 times. "Metal ion distribution" and "NOx purification performance" were examined in the same manner as in Example 1. The results are shown in Table 1.

Example 7

A zeolite structure was produced in the same manner as in Example 2 except that the metal ion-containing solution used in ion exchange treatment was changed to an aqueous solution containing 0.1 mol/liter of silver nitrate, the time length of immersion of honeycomb-shaped structure in metal ion-containing solution was changed to 3 hours, and the times of ion exchange were changed to 3 times. The zeolite structure was examined for "HC (hydrocarbon) adsorption capability" by the above-mentioned method. The results are shown in Table 2.

Example 8

A zeolite structure was produced in the same manner as in Example 2 except that the metal ion-containing solution used in ion exchange treatment was changed to an aqueous solution containing 0.05 mol/liter of copper sulfate, the time length of immersion of honeycomb-shaped structure in metal ion-containing solution was changed to 2 hours, and the times of ion exchange were changed to 5 times. The zeolite structure was examined for "HC (hydrocarbon) adsorption capability" by the above-mentioned method. The results are shown in Table 2.

Comparative Example 1

A zeolite structure was produced in the same manner as in Example 1 except that "Ion exchange" was conducted in "Powder state" and "SiO$_2$/Al$_2$O$_3$ ratio" was changed as shown in Table 1. "Metal ion distribution" and "NOx purification performance" were examined in the same manner as in Example 1. The results are shown in Table 1.

Comparative Example 2

A zeolite structure was produced in the same manner as in Comparative Example 1 except that "Kind of zeolite" was changed to "β-zeolite" and the "metal ion" contained in the zeolite powder was "copper ion". "Metal ion distribution" and "NOx purification performance" were examined in the same manner as in Comparative Example 1. The results are shown in Table 1.

Comparative Example 3

A zeolite structure was produced in the same manner as in Comparative Example 1 except that "$SiO_2/Al_2O_3$ ratio" was changed as shown in Table 1 and the "metal ion" contained in the zeolite powder was "copper ion". The zeolite structure was examined for "HC (hydrocarbon) adsorption capability" by the above-mentioned method. The results are shown in Table 2.

It is clear from Table 1 that the zeolite structures of Examples 1 to 6 are superior in NOx purification performance at 200° C. and 300° C., particularly superior in NOx purification performance at 300° C. and, in contrast, the zeolite structures of Comparative Examples 1 and 2 are inferior in NOx purification performances at 200° C. and 300° C.

It is clear from Table 2 that the zeolite structures of Examples 7 and 8 are high in hydrocarbon adsorption ratios at 60° C. and 180° C. and, in contrast, the zeolite structure of Comparative Example 3 is low in hydrocarbon adsorption ratios at 60° C. and 180° C. It is also clear that the difference between the hydrocarbon adsorption ratios of the zeolite structures of Examples 7 and 8 and the hydrocarbon adsorption ratio of the zeolite structure of Comparative Examples 3 is large particularly at 180° C.

INDUSTRIAL APPLICABILITY

The zeolite structure of the present invention can be suitably used for the purification of the NOx, etc. contained in the exhaust gases emitted from automotive engines, engines for construction machines, industrial stationary engines, burners, etc.

EXPLANATION OF NUMERICAL SYMBOLS

1: partition wall; 1a: surface portion; 1b: inner portion; 2: cell; 3: surface of partition wall; 4: outer peripheral wall; 11: one end face; 12: other end face; 21: test equipment for HC adsorbability; 22: mixer; 23: heater; 24: zeolite structure; 25: analyzer; 26: analytical device; 100: zeolite structure

The invention claimed is:

1. A zeolite structure having a honeycomb shape and having partition walls that define a plurality of cells extending from one end face of the zeolite structure to its other end face so as to function as fluid passages, wherein each partition wall has an inner portion and two surface portions, wherein each partition wall is ion-exchanged with metal ions such that a content amount of metal ion per unit zeolite in each surface portion of each partition wall is larger than a content amount of metal ion per unit zeolite in the inner portion of the partition wall, wherein a main metal ion in the surface portion of the partition walls and a main metal ion in the inner portion of the partition walls are different from each other, and wherein all of the partition walls in the zeolite structure have the same ion-exchanged profile.

2. The zeolite structure according to claim 1, wherein the content amount of the metal ion per unit zeolite in the surface portion of the partition walls is 1.1 to 5.0 times the content amount of the metal ion per unit zeolite in the inner portion of the partition walls.

3. The zeolite structure according to claim 1, wherein the metal ion in the surface portion of the partition walls is at least one kind selected from the group consisting of iron ion, copper ion and silver ion and the metal ion in the inner portion of the partition walls is at least one kind selected from the group consisting of iron ion, copper ion and silver ion.

4. The zeolite structure according to claim 1, wherein the main metal ion in the surface portion of the partition walls is iron ion and the main metal ion in the inner portion of the partition walls is copper ion.

5. The zeolite structure according to claim 2, wherein the metal ion in the surface portion of the partition walls is at least one kind selected from the group consisting of iron ion, copper ion and silver ion and the metal ion in the inner portion of the partition walls is at least one kind selected from the group consisting of iron ion, copper ion and silver ion.

6. A method for producing a zeolite structure, which comprises
extruding a forming material comprising a zeolite powder and a forming aid, to form a honeycomb-shaped body which has partition walls forming a plurality of cells extending from one end face of the honeycomb-shaped body to its other end face and functioning as a passage of fluid, wherein each partition wall has an inner portion and two surface portions,
firing the honeycomb-shaped body, and
subjecting the fired honeycomb-shaped body to an ion exchange treatment with metal ions to produce a zeolite structure wherein the content per unit zeolite amount of metal ion in each surface portion of each partition wall is larger than the content per unit zeolite amount of metal ion in the inner portion of the partition wall, wherein a main metal ion in the surface portion of the partition walk and a main metal ion in the inner portion of the partition walls are different from each other, and wherein all of the partition walls in the zeolite structure have the same ion-exchanged profile.

7. The method for producing a zeolite structure according to claim 6, wherein the metal ion is at least one kind selected from the group consisting of iron ion, copper ion and silver ion.

8. The method for producing a zeolite structure according to claim 7, wherein the metal ion contains at least iron ion and copper ion.

9. The method for producing a zeolite structure according to claim 6, wherein the ion-exchange treatment with a metal ion, to the fired honeycomb-shaped body is conducted a plurality of times and the kind of the metal ion used in at least one time of ion-exchange treatment is different from the kind of the metal ion used in remaining ion-exchange treatment.

10. The method for producing a zeolite structure according to claim 9, wherein, in the ion-exchange treatment of a plurality of times, the final ion-exchange treatment is an ion-exchange treatment only for the surface portion of the partition wall and the remaining ion-exchange treatment is an ion-exchange treatment for the surface portion and inner portion of the partition wall.

11. The method for producing a zeolite structure according to claim 10, wherein the ion-exchange treatment is conducted using a metal ion-containing solution and the metal ion concentration in the solution is the same in all the ion-exchange treatments conducted a plurality of times, and, in the ion-exchange treatments of a plurality of times, the time length of final ion-exchange treatment is ½ or less relative to the total time length of remaining ion-exchange treatment.

12. The method for producing a zeolite structure according to claim 10, wherein the ion-exchange treatment is conducted using a metal ion-containing solution and, in the ion-exchange treatments of a plurality of times, the metal ion concentration in the metal ion-containing solution used in final ion-exchange treatment is ½ or less relative to the metal ion concentration in the metal ion-containing solution used in remaining ion-exchange treatment.

13. The method for producing a zeolite structure according to claim 7, wherein the ion-exchange treatment with a metal ion, to the fired honeycomb-shaped body is conducted a plurality of times and the kind of the metal ion used in at least one time of ion-exchange treatment is different from the kind of the metal ion used in remaining ion-exchange treatment.

14. The method for producing a zeolite structure according to claim 8, wherein the ion-exchange treatment with a metal ion, to the fired honeycomb-shaped body is conducted a plurality of times and the kind of the metal ion used in at least one time of ion-exchange treatment is different from the kind of the metal ion used in remaining ion-exchange treatment.

15. The method for producing a zeolite structure according to claim 13, wherein, in the ion-exchange treatment of a plurality of times, the final ion-exchange treatment is an ion-exchange treatment only for the surface portion of the partition wall and the remaining ion-exchange treatment is an ion-exchange treatment for the surface portion and inner portion of the partition wall.

16. The method for producing a zeolite structure according to claim 14, wherein, in the ion-exchange treatment of a plurality of times, the final ion-exchange treatment is an ion-exchange treatment only for the surface portion of the partition wall and the remaining ion-exchange treatment is an ion-exchange treatment for the surface portion and inner portion of the partition wall.

\* \* \* \* \*